(12) United States Patent
Kim et al.

(10) Patent No.: US 6,377,536 B1
(45) Date of Patent: Apr. 23, 2002

(54) OPTICAL PICK-UP APPARATUS

(75) Inventors: Young Sik Kim, Kyunggi-do; Sung Chan Park, Seoul; In Seop Eom, Kyunggi-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/216,881

(22) Filed: Dec. 21, 1998

(30) Foreign Application Priority Data

Dec. 22, 1997 (KR) .............................................. 97-71979

(51) Int. Cl.$^7$ .................................................. G11B 7/00
(52) U.S. Cl. ................................ 369/112.17; 369/44.23
(58) Field of Search ........................ 369/112, 94, 44.37, 369/58, 110, 44.38, 116, 44.23, 112.01, 112.02, 112.23, 44.24, 112.17

(56) References Cited

U.S. PATENT DOCUMENTS

| | | | |
|---|---|---|---|
| 5,835,473 A | * 11/1998 | Shimozono et al. | 369/112 |
| 5,856,965 A | * 1/1999 | Tsuchiya et al. | 369/58 |
| 5,905,708 A | * 5/1999 | Richter | 369/112 |
| 5,933,401 A | * 8/1999 | Lee et al. | 369/112 |
| 5,974,020 A | * 10/1999 | Ju et al. | 369/112 |
| 5,982,732 A | * 11/1999 | Yamanaka | 369/112 |
| 5,986,994 A | * 11/1999 | Kojima et al. | 369/112 |
| 6,016,301 A | * 1/2000 | Takasawa et al. | 369/112 |
| 6,195,315 B1 | * 2/2001 | Takahashi et al. | 369/44.23 |

FOREIGN PATENT DOCUMENTS

| | | | |
|---|---|---|---|
| JP | 11-39701 | * | 2/1999 |
| JP | 11-39705 | * | 2/1999 |
| JP | 11-53755 | * | 2/1999 |

* cited by examiner

Primary Examiner—David Hudspeth
Assistant Examiner—Kim-Kwok Chu
(74) Attorney, Agent, or Firm—Birch, Stewart, Kolasch & Birch, LLP

(57) ABSTRACT

An optical pick-up apparatus which can adaptively compensate for the aberration of a light beam. The optical pick-up apparatus employees a first light source for generating a first light beam having a first wavelength to be irradiated on a first type of disk and a second light source for generating a second light beam having a second wavelength to be irradiated on a second type of disk. A light path enables the first light beam from the first light source to be irradiated on the disk in the shape of a spot by a finite optical system. The light path allows the second light beam from the second light source to be irradiated on the disk in the shape of a spot by an infinite optical system.

4 Claims, 6 Drawing Sheets

OPTICAL PICK-UP APPARATUS

BACKGROUND OF THE INVENTION

1. Field of the Invention

This invention relates to an optical pick-up apparatus adapted to access different types of disks.

2. Description of the Related Art

An optical disc such as CD(Compact disc) and CD-R (CD-Recordable) is used to write audio, video and digital text information and so on, as a recording medium. The optical disc are used to record large amounts of information. To this end, there has recently appeared a DVD(Digital Versatile Disc) capable of recording amounts of information comparable to the CD and CD-R. A DVD is not only higher than the CD and CD-R in track density, but also the distance extending from the disc surface to the recording layer is less than previous disks. For example, the distance between the disc surface and the recording layer in a DVD is 0.6 mm while that in a CD and CD-R is 1.2 mm. Also, the recording layer of a DVD has characteristics different from that of the CD and CD-R. Due to the structural differences between a DVD and a CD and CD-R, the DVD demands an optical pick-up apparatus different from the optical pick-up apparatus for a CD and CD-R. The optical pick-up apparatus for a DVD cannot access a CD and CD-R because of the aberration of the light beam. Aberration of the light beam is generated between the surface and recording layer of a CD and CD-R due to the larger distance between the surface and recording layer than the distance in a DVD. Also, the aberration of the light beam appears on the optical pickup apparatus for a CD and CD-R as the difference between the wave lengths of the light beams.

FIG. 1 shows an optical pick-up apparatus of an infinite optical system having a flux diameter controller to remove such aberrations when a CD and CD-R are accessed. The optical pick-up apparatus includes a first hologram module 12, a beam splitter 14, a collimator 16 and a reflective mirror 18 aligned in a horizontal direction. Also, the optical pick-up apparatus of FIG. 1 also includes a second hologram module 20 located at the beam splitter 14, a flux diameter controller 22 and an objective lens arranged between the reflective mirror 18 and a disc 10A or 10B. The first and second hologram modules 12 and 20 each have a light source and a photo detector. The light source of first hologram module 12 generates a light beam having a wavelength of 650 nm to be irradiated on the DVD 10A, while the light source of the second hologram module 20 irradiates another light beam having a wavelength of 780 nm on the CD or CD-R 10B. The beam splitter 14 transmits the light beams from the first and second hologram modules 12 and 20 to the collimator 16, and allows the light beams from the collimator 16 to be distributed to both the first and second hologram modules 12 and 20. The collimator 16 causes the light beams from the beam splitter 14 to proceed toward the reflective mirror 18 in parallel. The flux diameter controller 22 controls the flux diameter of a light beam transmitted between the reflective mirror 18 and the objective lens 24, according to the disc 10A or 10B. If DVD 10A is accessed, i.e., when the light beam has the wavelength of 650 nm, the flux diameter controller 22 allows the light beam from the reflective mirror 18 to go directly toward the objective lens 24. On the other hand when accessing CD/CD-R 10B, the flux diameter controller 22 decreases the flux diameter of the light beam from the reflective mirror 18 and transmits the light beam having a decreased flux diameter to the objective lens 24. The objective lens 24 converges the light beam from the flux diameter controller 22 onto the recording layer of the disc 10A or 10B, i.e., on the recording layer of the DVD 10A or on the recording layer of the CD or CD-R 10B, in the shape of a spot. Light beams having a wavelength of 650 nm are irradiated on the recording layer of DVD 10A in the shape of a spot, while light beams having a wavelength of 780 nm are irradiated on the recording layer of the CD or CD-R 10B in the shape of a spot.

In the optical pick-up apparatus of FIG. 1, since the flux diameter controller 22 is located between the collimator 18 and the objective lens 24, the configuration is complex and the manufacturing costs are great. Also, a light beam can only be traced to a track on the disc 10A or 10B if the flux diameter controller 22 an objective lens 24 are driven by actuator 26. The heavy weight load of the actuator limits the speed at which the disc may be access to a critical speed. Furthermore, in the optical pick-up apparatus of FIG. 1, each of the first and second hologram modules 12 and 20 must be accurately installed at the demanded location such that the center axis of the light beam proceeding from the first hologram module 12 is united with the center axis of the light beam proceeding from the second hologram module 20. However, the center axis of the light beam proceeding from the first hologram module 12 can not be united with the center axis of the light beam proceeding from the second hologram module 20 due to a locating error and an angle error caused in the combination of the optical pick-up apparatus.

SUMMARY OF THE INVENTION

Accordingly, it is an object of the present invention to provide an optical pick-up apparatus which can adaptively compensate for the aberration of the light beam according to the type of disk.

It is another object of the present invention to provide an optical pick-up apparatus which has the facility to unite center axes of light beams from two light sources.

In order to obtain said objects of the invention, according to one aspect of the present invention, an optical pick-up apparatus comprises: a first light source for generating a first light beam having a first wavelength to be irradiated on a disk; a second light source for generating a second light beam having a second wavelength to be irradiated on the disk; and a light path for irradiating the first light beam from the first light source on the disk in the shape of a spot by a finite optical system and the second light beam from the second light source on the disk in the shape of a spot by an infinite optical system.

Further, according to other aspect of the present invention, an optical pick-up apparatus comprises: a first light source for generating a first light beam having a first wavelength to be irradiated on a disk; a second light source for generating a second light beam having a second wavelength to be irradiated on the disk; an objective lens for irradiating the first and second light beams from the first and second light sources on the disk in a shape of spot; a beam splitter for guiding the first light beam from the first light source and the second light beam from the second light source to the objective lens; and light axis control means between the first light source and the beam splitter to remove the center axis of the first light beam.

Furthermore, according to another aspect of the present invention, an optical pick-up apparatus comprises: a first light source for generating a first light beam of a first wavelength to be irradiated on a disk; a second light source for generating a second light beam of a second wavelength to be irradiated on the disk, the second including a light element for generating the second light beam and a location controller for controlling the location of the light element in the planer; and a light path for irradiating the first light beam from the first light source and the second light beam from the second light source on the disk in the shape of a spot.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 2:
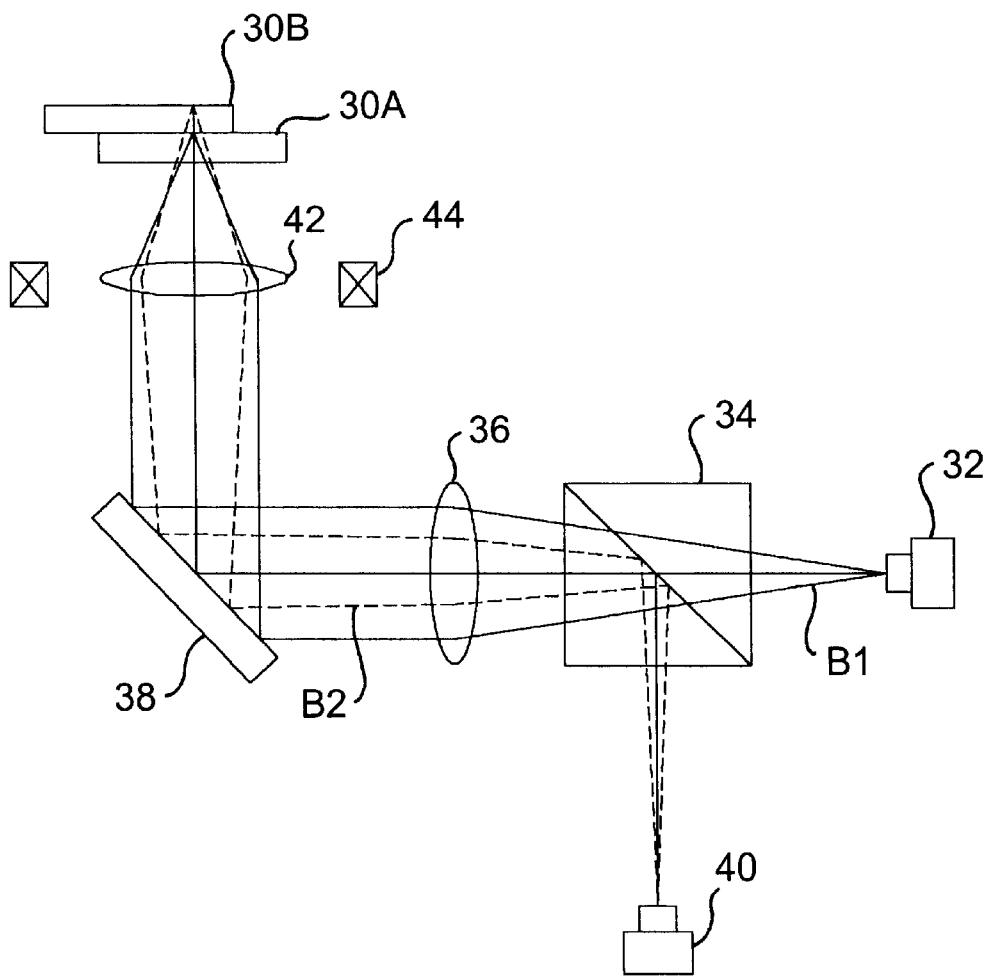
FIG. 2 is a schematic view of a configuration of an optical pick-up apparatus according to an embodiment of the present invention.

Referring to FIG. 2, there is illustrated an optical pick-up apparatus according to an embodiment of the present invention including a first hologram module 32, a beam splitter 34, a collimator 36 and a reflective mirror 38 arranged in a horizontal direction. Also, the optical pick-up apparatus of FIG. 2 further comprises a second hologram module 40 disposed adjacent to the beam splitter 34; an objective lens 42 located between a discs 30A and 30B; and the reflective mirror 38. The first and second hologram modules 32 and 40 each have a light source and a photo detector. The light source of first hologram module 32 generates a first light beam B1 having a wavelength of 650 nm, to be irradiated on one of the discs 30A or 30B, while the light source of the second hologram module 40 irradiates a second light beam B2 having the wavelength of 780 nm on one of the discs 30A or 30B. The beam splitter 34 transmits the first and second light beams B1 and B2 from the first and second hologram modules 32 and 40 toward the collimator 36, and allows the light beam from the collimator 36 to be distributed into the first and second hologram modules 32 and 40. The collimator 36 causes the first light beam B1 from the first hologram module 32 passing through the beam splitter 34 to proceed toward the reflective mirror 38 in parallel. Also, the collimator 36 allows the second light beam B2 from the second hologram module 40, through the splitter 34, to go toward the reflective mirror 38 in such a manner that the second light beam is concentrated. Since the second light beam B2 concentrated by the collimator 36 is different from the first light beam B1, the numerical aperture of the objective lens 42 for the second light beam B2 is small relative to that of the objective lens 42 for first light beam B1. In other words, the collimator 36 enables the optical pick-up apparatus of the present invention to be driven in the infinite optical system for the first light beam B1, while operating in the finite optical system for the second light beam B2. To this end, the first hologram module 32 is located at the focusing distance of the collimator 36, while the second hologram module 40 is installed at a closer distance-shorter than the focusing distance of the objective lens 42. The reflective mirror 38 reflects the first or second light beam B1 or B2 from the collimator 36 toward the objective lens 42 in the perpendicular and allows the light beam from the objective lens 42 to proceed toward the collimator 36. The objective lens 42 allows the first or second light beams B1 or B2 from the reflective mirror 38 to be irradiated on the recording layer of the disc 10A or 10B, i.e., on the recording layer of DVD 10A or on the recording layer of the CD and CD-R 10B, in the shape of a spot. In detail, the objective lens 42 irradiates the first light beam B1 proceeding in parallel from the reflective mirror 38 on the recording layer of the DVD 10A, and enables the second light beam B2 in concentrated shape from the reflective mirror 38 to be irradiated on the recording layer of the CD or CD-R 30B. In the optical pick-up apparatus according to the embodiment of the present invention, the finite and infinite optical systems are adaptively driven depending on the discs 30A and 30B such that the aberration of the light beam does not appear in the CD and CD-R 30B as well as the DVD 30A. Since the flux diameter controller is removed from the optical pick-up apparatus according to the embodiment of the present invention, an actuator 44 can control the tracking and focusing of the light beam on the discs 30A and 30B by driving only the objective lens 42. Therefore, in the optical pick-up apparatus according to the embodiment of the present invention, the actuator 44 is light weight and the configuration is simple. As a result, the optical pick-up apparatus can access the disc rapidly relative to the critical speed.

Figure 3:
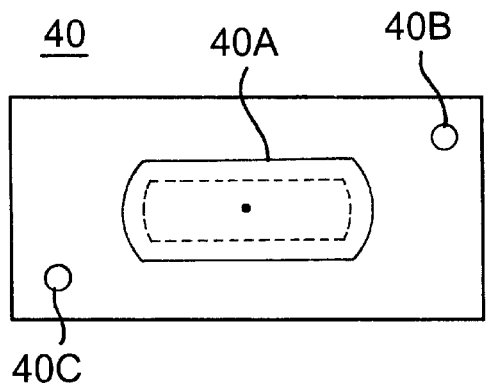
FIG. 3 is a plan view of the second hologram module shown in FIG. 2.

The second hologram module 40 of FIG. 2 includes a light element 40A, first and second control levels 40B and 40C, as shown FIG. 3. The light element 40A consists of a light source and a photo detector. The first control level 40B is driven to move the light element 40A in the vertical direction, i.e., along an axis of X. The second control level 40C is driven to move the light element 40A in the horizontal direction, i.e., along an axis of Y. By the first and second control levels, the location of the light element 40A is changed in the vertical and horizontal directions. As a result, the center axis of the second light beam B2 generated by the first hologram module 40 is aligned with the center axis of the first light beam B1 from the first hologram module 32. Also, the first hologram module 32 can be manufactured to have the same basic construction as the second hologram module 40.

Figure 1:
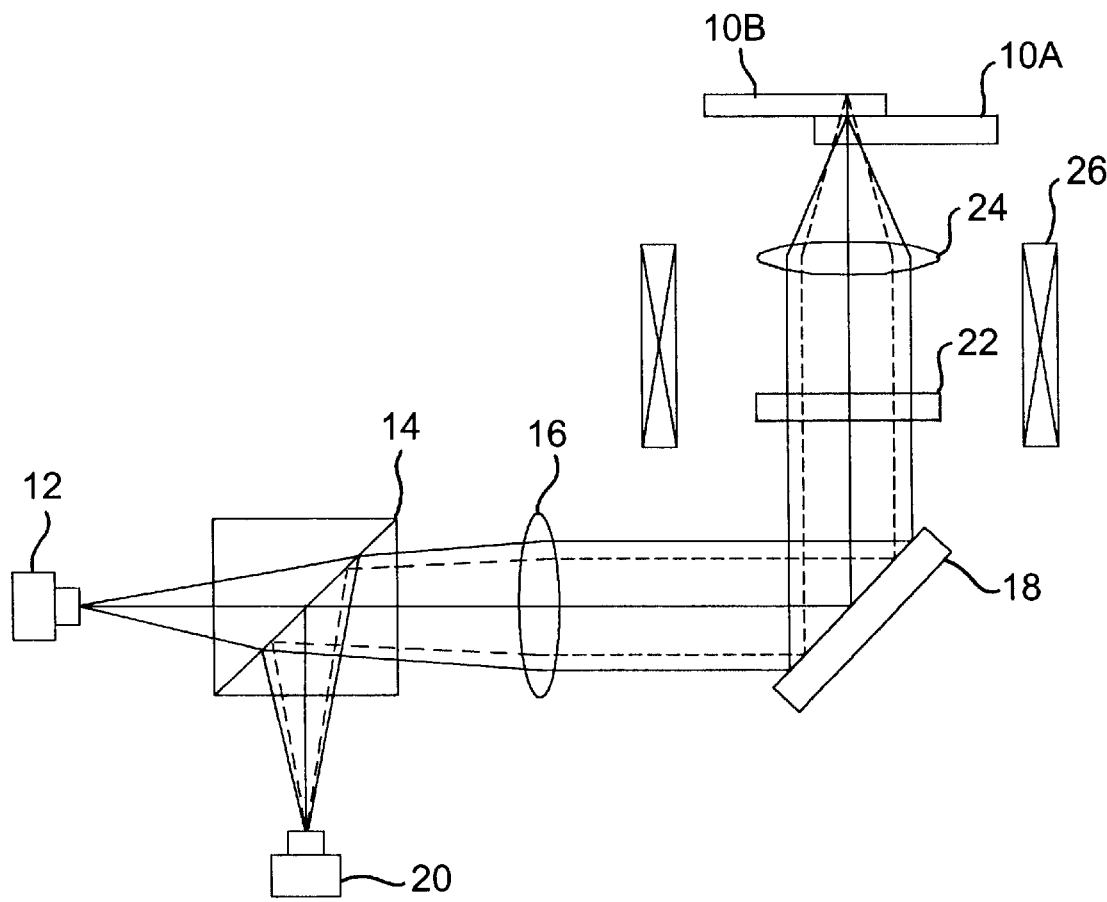
FIG. 1 is a schematic view of a configuration of a related art optical pick-up apparatus.
Figure 4:
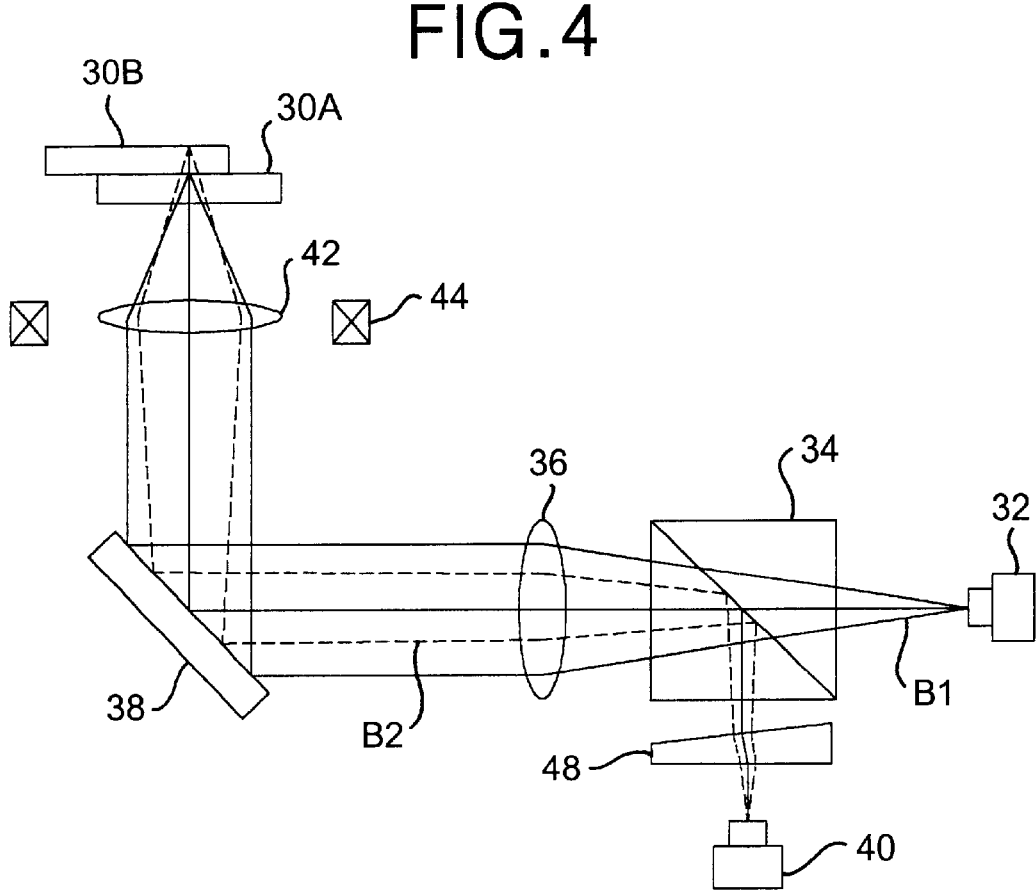
FIG. 4 is a schematic view of a configuration of an optical pick-up apparatus according to another embodiment of the present invention.

FIG. 4 illustrates an optical pick-up apparatus according to another embodiment of the present invention. The optical apparatus of FIG. 4 is similar to the optical pick-up apparatus shown in FIG. 2. The optical pick-up apparatus of FIG. 4 differs in that a wedge prism 46 is additionally disposed between the second hologram module 40 and the beam splitter 34. Also, the optical pick-up apparatus of FIG. 4 has the first and second hologram modules 32 and 40 identified with the first and second hologram modules 12 and 20 as shown in FIG. 1. The wedge prism 46 is rotated to move the center axis of the second light beam B2 proceeding from the second hologram module 40 in the vertical and horizontal directions of the beam splitter 34. Therefore, the center axis of the second light beam B2 is aligned with the center axis of the first light beam B1.

Figure 5:
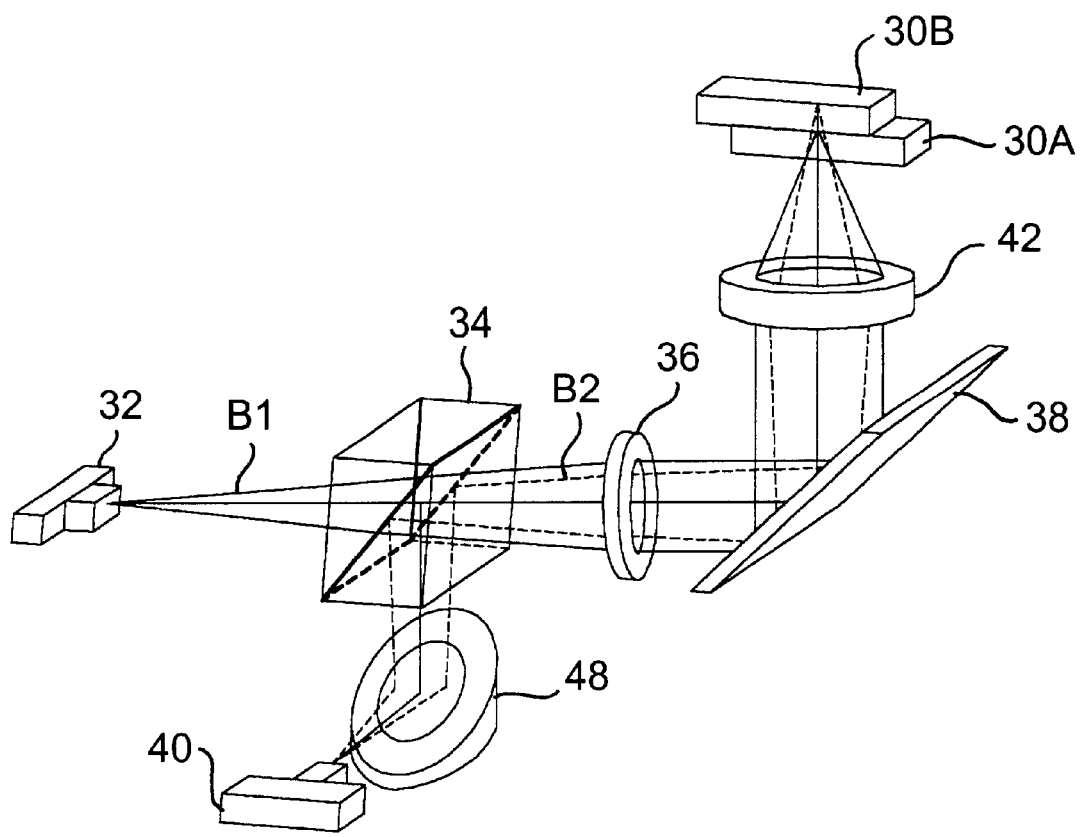
FIG. 5 is a schematic view of a configuration of an optical pick-up apparatus according to another embodiment of the present invention.

FIG. 5 illustrates an optical pick-up apparatus according to another embodiment of the present invention. The optical apparatus of FIG. 5 is similar to the optical pick-up apparatus shown in FIG. 4. The optical pick-up apparatus of FIG. 5 differs in that a wedge mirror plate 48 is replaced with the wedge prism 46 shown in FIG. 4. The wedge mirror plate 48 is rotated to move the center axis of the second light beam B2 proceeding from the second hologram module 40 in the vertical and horizontal directions of the beam splitter 34. Therefore, the center axis of the second light beam B2 is aligned with the center axis of the first light beam B1.

Figure 6:
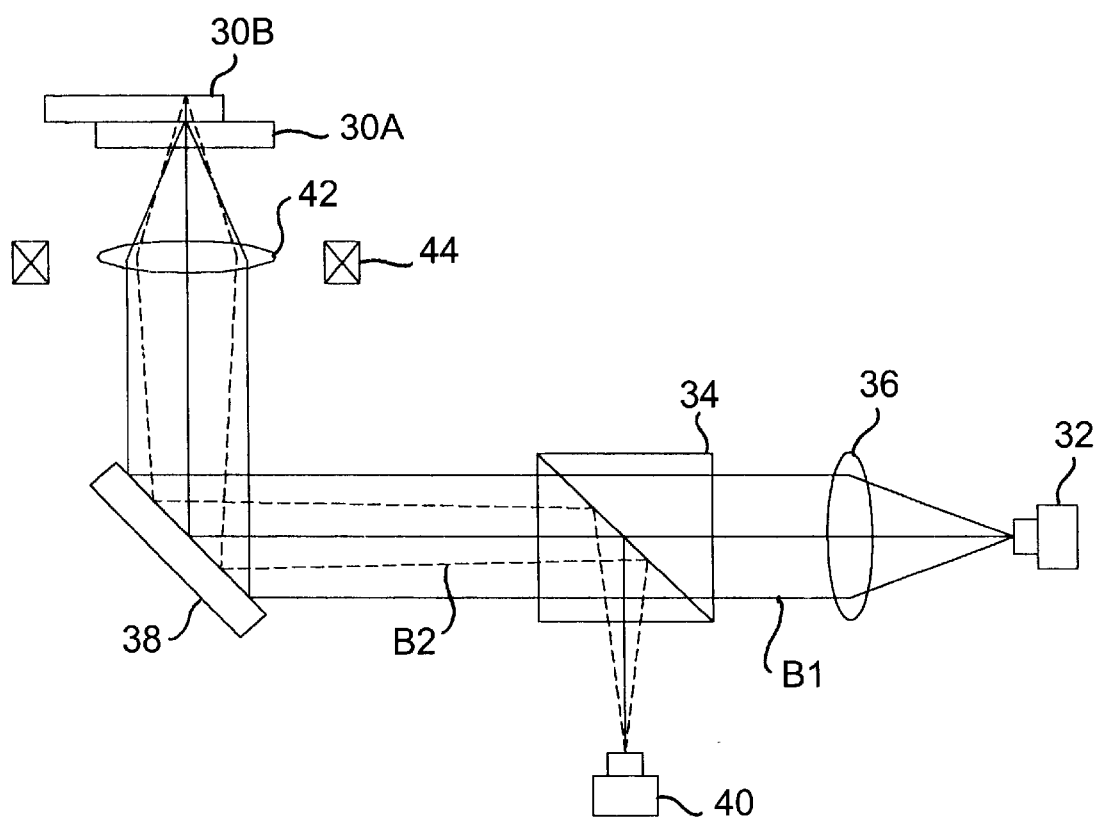
FIG. 6 is a schematic view of a configuration of an optical pick-up apparatus according to another embodiment of the present invention.

FIG. 6 shows an optical pick-up apparatus according to another embodiment of the present invention. The optical apparatus of FIG. 6 is similar to the optical pick-up apparatus shown in FIG. 2. The optical pick-up apparatus of FIG. 6 differs in that the collimator 36 is moved from between the beam splitter 34 and the reflective mirror 38 to between the first hologram module 32 and the beam splitter 34. The collimator 36 causes the first light beam B1 from the first hologram module to proceed toward the beam splitter 34 in the parallel. Therefore, the optical pick-up apparatus of FIG. 6 is driven in the infinite optical system for the first light beam B1. Meanwhile, the first hologram module 40 is disposed at a location corresponding to the focusing distance of the objective lens 42. As a result, the optical pick-up apparatus of FIG. 6 operates in the finite optical system for the second light beam B2.

Figure 7:
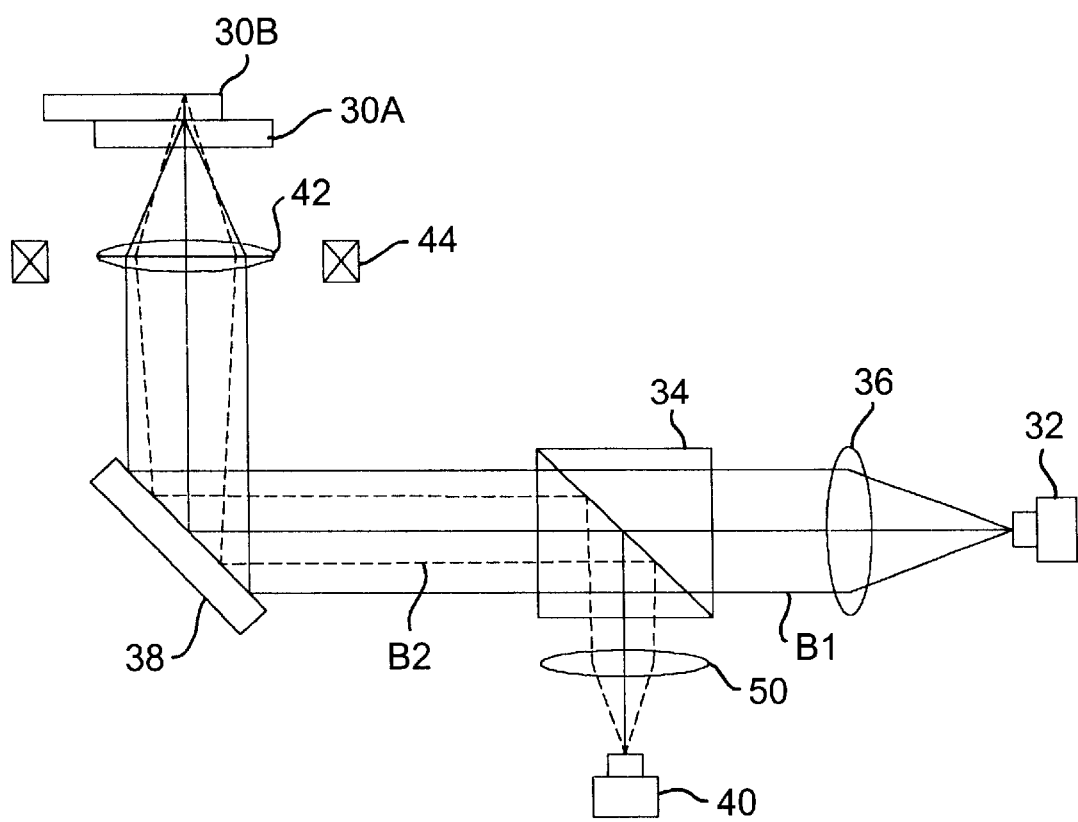
FIG. 7 is a schematic view of a configuration of an optical pick-up apparatus according to another embodiment of the present invention.

FIG. 7 illustrates an optical pick-up apparatus according to another embodiment of the present invention. The optical apparatus of FIG. 7 is similar to the optical pick-up apparatus shown in FIG. 6. The optical pick-up apparatus of FIG. 7 differs in that a concentric lens 50 is additionally installed between the second hologram module 40 and the beam splitter 34. The concentric lens 50 allows the second light beam B2 from the second hologram module 40 to go toward the beam splitter 34 in such a manner that the second light beam B2 is concentrated. Therefore, the optical path of the second light beam B2 is short. In other words, the distance between the second hologram module 40 and the objective lens 42 is shorter than the focusing distance of the objective lens 42. As a result, the optical pick-up apparatus of FIG. 7 is small in size.

As described above, an optical pick-up apparatus according to the embodiment of the present invention is driven in the infinite or finite optical system depending on the type of the discs such that the aberration of the light beam does not appeared in the CD and CD-R 30B as well as the DVD 30A. Since the flux diameter controller is removed from the optical pick-up apparatus according to the embodiment of the present invention, the actuator can control the tracking and focusing of the light beam on the disc by driving only the objective lens. Therefore, in the optical pick-up apparatus according to the embodiment of the present invention, the actuator has a light weight load and the configuration is simple. As a result, the optical pick-up apparatus can access the disc rapidly relative to the critical speed.

Also, in the optical pick-up apparatus according to the present invention, any one of a light beam for the CD and CD-R and a light beam for the DVD is finely moved. Therefore, the center axis of the light beam for the CD and CD-R is accurately united to the center axis of the light beam for the DVD.

Although the present invention has been explained by the embodiments shown in the drawing hereinbefore, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their legal equivalents.

What is claimed is:

1. An optical pick-up apparatus comprising:

a first light source for generating a first light beam having a first wavelength to be irradiated on a disk;

a second light source for generating a second light beam having a second wavelength to be irradiated on the disk;

a light path for irradiating the first light beam from the first light source and the second light beam from the second light source on the disk in a shape of a spot, the light path including:

an objective lens for converging the first and second light beams from the first and second light sources on the disk in a shape of a spot;

a collimator for allowing the first light beam from the first light source to go toward the objective lens in parallel and for enabling the second light beam from the second light source to go toward the objective lens in the collimated form;

a beam splitter for guiding the first light beam from the first light source and the second light beam from the second light source toward the objective lens through any one of a direct path and the collimator; and an optical axis control means between the first light source and the beam splitter for aligning the center axis of the first light beam proceeding from the first light source toward the beam splitter, wherein the light path irradiates the first light beam from the first light source on the disk in the shape of the spot by a finite optical system and the second light beam from the second light source on the disk in the shape of the spot by an infinite optical system.

2. The apparatus as set forth in claim 1, wherein the optical axis control means includes a wedge prism for aligning the first light beam in the vertical and horizontal directions of the beam splitter.

3. The apparatus as set forth in claim 1, wherein the optical axis control means includes a wedge mirror plate for aligning the first light beam in the vertical and horizontal directions of the beam splitter.

4. The apparatus as set forth in claim 1, wherein the first light source comprises:

a light source for generating the first light beam;

a first adjusting means for moving the light source in the vertical direction; and a second adjusting means for aligning the light source in the horizontal direction.

* * * * *